(12) United States Patent
Yuan

(10) Patent No.: US 12,644,583 B1
(45) Date of Patent: Jun. 2, 2026

(54) VARIABLE MOUNT LED LIGHT HOLDING SYSTEM

(71) Applicant: Qing Yuan, Elkhart, IN (US)

(72) Inventor: Qing Yuan, Elkhart, IN (US)

( * ) Notice: Subject to any disclaimer, the term of this patent is extended or adjusted under 35 U.S.C. 154(b) by 0 days.

(21) Appl. No.: 18/831,489

(22) Filed: Feb. 25, 2025

(51) Int. Cl.
| | |
|---|---|
| *F21V 21/088* | (2006.01) |
| *B60Q 3/40* | (2017.01) |
| *B60Q 3/51* | (2017.01) |
| *B60Q 3/74* | (2017.01) |
| *F21S 4/20* | (2016.01) |
| *F21V 21/005* | (2006.01) |
| *B60Q 1/26* | (2006.01) |
| *F21Y 115/10* | (2016.01) |

(52) U.S. Cl.
CPC .............. *F21V 21/088* (2013.01); *B60Q 3/40* (2017.02); *B60Q 3/51* (2017.02); *B60Q 3/74* (2017.02); *F21S 4/20* (2016.01); *F21V 21/005* (2013.01); *B60Q 1/2615* (2013.01); *B60Q 1/2696* (2013.01); *F21Y 2115/10* (2016.08)

(58) Field of Classification Search
CPC ........ F21V 21/088; F21V 21/005; F21S 4/20; B60Q 3/51; B60Q 3/40; B60Q 3/74
See application file for complete search history.

(56) References Cited

U.S. PATENT DOCUMENTS

| | | | | |
|---|---|---|---|---|
| 2014/0313722 A1* | 10/2014 | Eloff | ......................... | F21S 4/22 |
| | | | | 362/418 |
| 2019/0145611 A1* | 5/2019 | May | ........................ | F21S 8/043 |
| | | | | 362/147 |
| 2021/0231289 A1* | 7/2021 | Pruitt | ........................ | F21V 3/02 |
| 2022/0049840 A1* | 2/2022 | Klus | ..................... | F21V 15/013 |
| 2022/0111791 A1* | 4/2022 | Hori | ....................... | B60Q 3/267 |
| 2025/0207763 A1* | 6/2025 | Rothbauer | ............ | F21V 23/002 |

* cited by examiner

*Primary Examiner* — Christopher E Dunay
(74) *Attorney, Agent, or Firm* — Fitch, Even, Tabin & Flannery LLP

(57) ABSTRACT

A light holding system is provided, especially suited for use in or on an RV and/or with LED light strips, having a retention strip and a light holder strip, those paired elements being interfit and interlocking via nesting of a recess, groove, or channel in each, the light holder channel being formed to releasably retain a LED light strip, and the light holder having laterally extending wings or flanges which overlay the retention strip at least in part (and any panel edge located by the retention strip). The system supports use of alternative light holder strips configured to provide greater spacing between the retention strip and the light holder strip, according to the use of a panel therebetween and/or the mounting location of the system to the vehicle, via different location and dimensioning of the interlocking elements.

12 Claims, 19 Drawing Sheets

VARIABLE MOUNT LED LIGHT HOLDING SYSTEM

BACKGROUND OF THE INVENTION

Field of the Invention

The present invention is an improvement upon the apparatus shown in U.S. Pat. No. 12,181,127, issued on Dec. 31, 2024. The prior art of record in that application should be considered in connection with evaluation of the present application.

Description of the Prior Art

The present invention relates generally to mounting systems for light emitting diode ("LED") strip lighting, and, more particularly, to such mounting systems for vehicular use, as in recreational vehicles ("RVs"). As used herein, the term "RV" refers to motorized and towable recreational vehicles, such as travel trailers, toy haulers, fifth wheel trailers, motor homes, and the like, having at least living quarters therein, and as otherwise defined by the Recreational Vehicle Industry Association, more information about which can be found on the internet at www.rvia.org. In general, an RV can be built from a wood or metal frame, overlaid with wall and ceiling panels. As taught in the '127 patent, LED strip lighting can be attached by securing a retaining strip to a wall or ceiling joist (typically a wood beam), then overlaying panels onto the retaining strip and/or joist, and then attaching the LED light holder to the retaining strip over the joint of the panels.

However, it is often desirable to mount the LED strip lighting onto a panel (rather than between panels) and at locations where there is no underlying joint or beam. Further, it may be desirable (such as with vehicle exterior applications) to mount the LED strip lighting without using wall or panel penetrating fasteners (so as to avoid possible fluid or moisture penetration into the vehicle). Further still, there are some aesthetic and/or structural applications of LED strip lighting where it is more desirable to have a flatter perception of the intrusion of the LED strip lighting into the living space (i.e., have the LED strip not protrude, or protrude only minimally, above the wall or ceiling surface to which it is mounted), than is available using the teachings of the '127 patent. At the same time, it is especially important in RV applications to keep both system costs and manufacturing complexity to a minimum, but at the same time to allow for convenient repair and replacement of system components. However, all of these considerations must not lose sight of the need for robust and reliable mounting of the LED strips in a vehicle which may need to endure significant structural movement and vibration, as well as high thermal variance. Still further, it can be advantageous for LED strip lighting to be readily retrofittable into pre-existing RV products, so as to extend the useful life of the RV and decrease overall consumer investment costs. In addition, the aesthetic appearance of an RV, including its interior features and fixtures, is important to its marketability, so the LED strip lighting system, including the configuration of the holding system, should not detract from that.

OBJECT OF THE INVENTION

Accordingly, a primary objective of the invention is to provide improved LED light holding systems, providing a variety of mounting options for LED strips. These improvements include providing such arrangements which:

a. are inexpensive and quick to manufacture, install, maintain, and repair,
b. increase floor plan, RV assembly, and construction optimization when used in a vehicle,
c. minimize component/system weight,
d. are readily retro-fitted into pre-existing RVs, and
e. increase the aesthetic appeal of RVs.

SUMMARY OF THE INVENTION

These and other objectives of the present invention are achieved by the provision of light holding system, especially suited for use in or on an RV and/or with LED strips, having a retention strip and a light holder strip, those paired elements being interfit and interlocking via nesting of a recess, groove, or channel in each, the light holder strip channel being formed to releasably retain a LED light strip, and the light holder strip having laterally extending wings or flanges which overlay the retention strip at least in part (and any panel edge located by the retention strip). The system supports use of alternative light holder strips configured to provide greater spacing between the retention strip and the light holder strip, according to the use of a panel therebetween and/or the mounting location of the system to the vehicle, via different location and dimensioning of the interlocking elements.

Other objects, advantages, and novel features of the present invention will become readily apparent from the following drawings and detailed description of certain preferred and alternative embodiments.

The present invention comprises, for example, the aesthetic appearance of a "low wing" LED light holding system having a nested light holder channel with curved lateral side wings, which arrangement presents a significantly lower elevation of the LED above the surface abutting the light holding system than prior art light holding systems, that lower elevation being proportional to the non-engaged length of the retention barb omitted with respect to prior art light holding systems.

3

Figure 11:
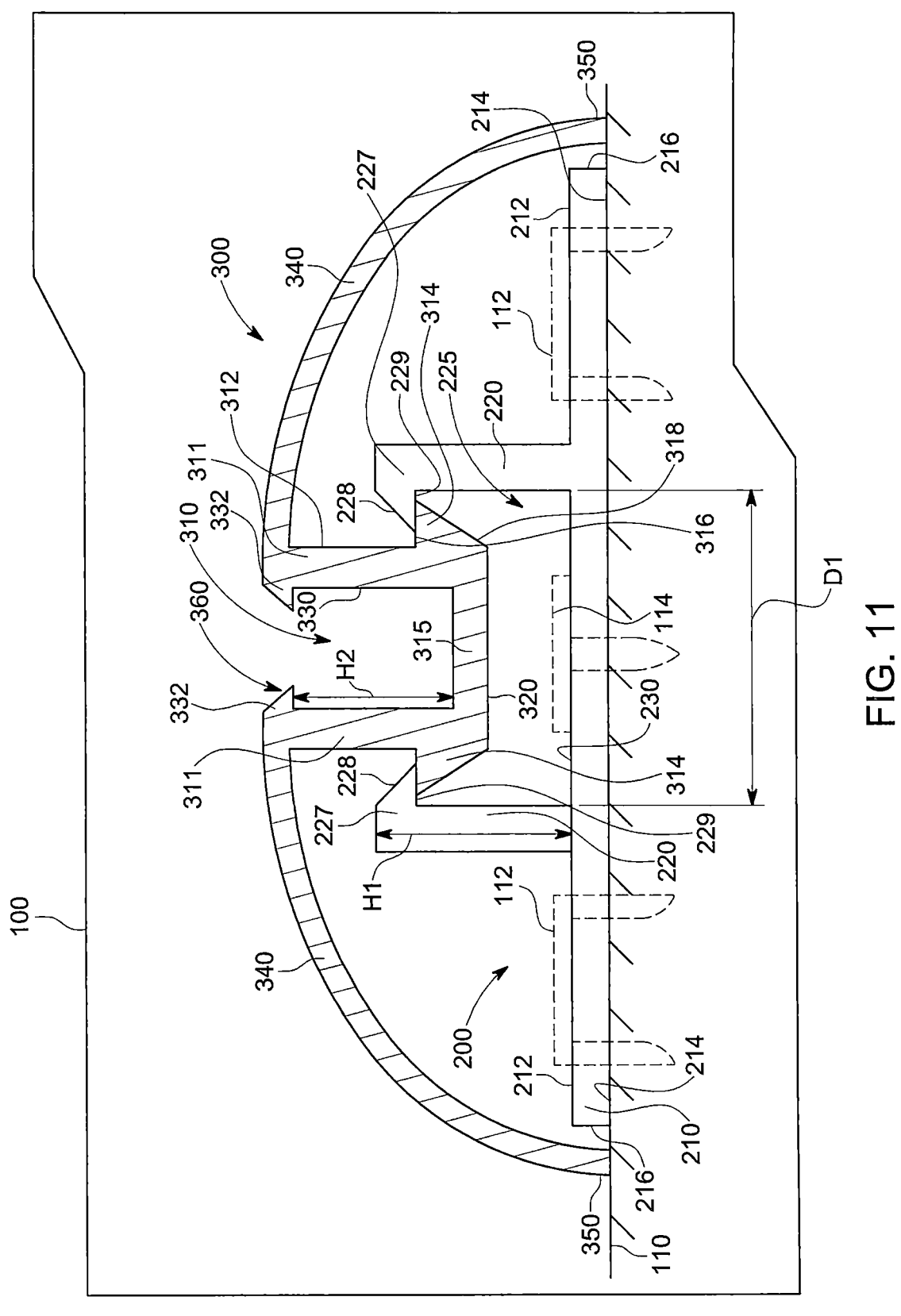

FIG. 11 is an end or lateral cross-sectional view of a second alternative light holder strip according to the present invention, as mounted with respect to a vehicle.

Figure 12:
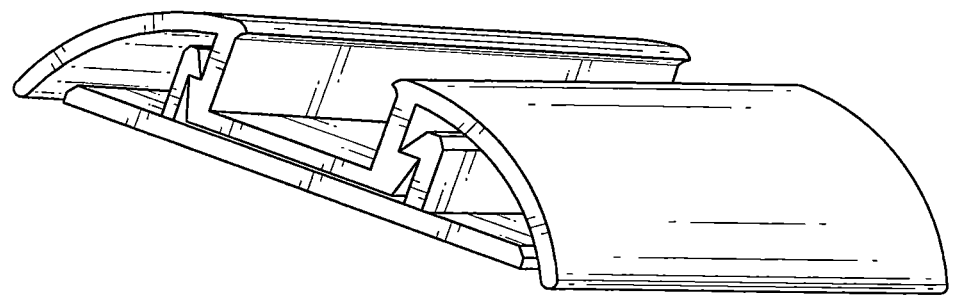

FIG. 12 is a right side perspective view of a preferred embodiment of the LED light holding system according to the present invention, illustrating aesthetic appearance.

Figure 13:
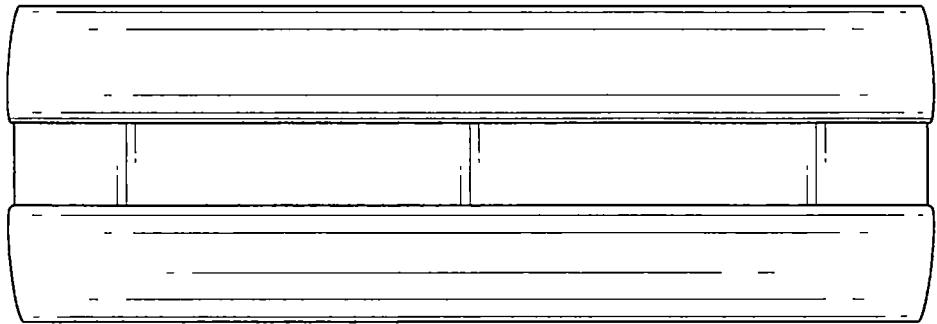

FIG. 13 is a top view of the LED light holding system of FIG. 12.

Figure 14:
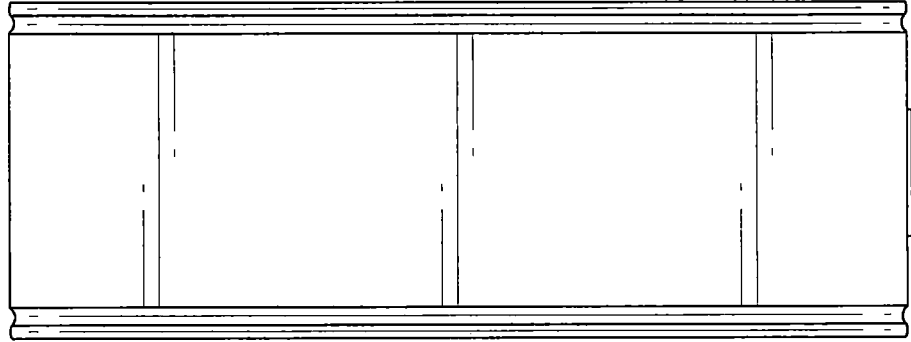

FIG. 14 is a bottom view of the LED light holding system of FIG. 12.

Figure 15:
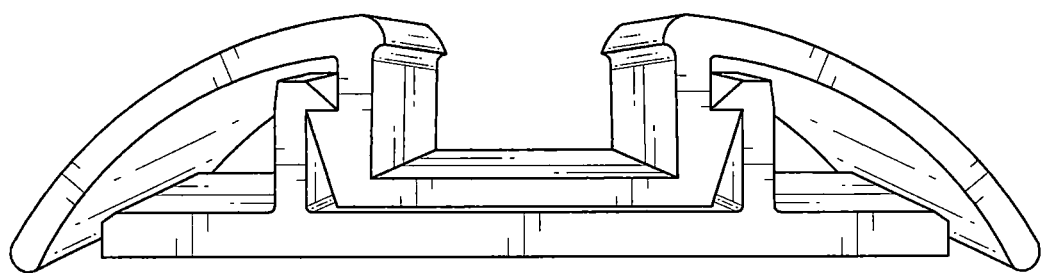

FIG. 15 is an end or lateral cross-sectional view of the LED light holding system of FIG. 12.

Figure 16:
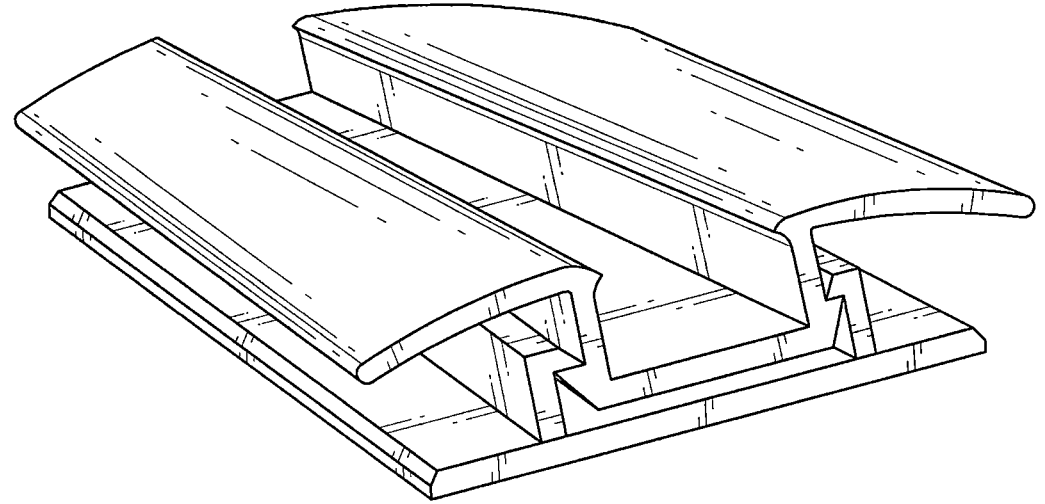

FIG. 16 is an upper, left side perspective view of a second preferred embodiment of the LED light holding system according to the present invention, illustrating aesthetic appearance.

Figure 17:
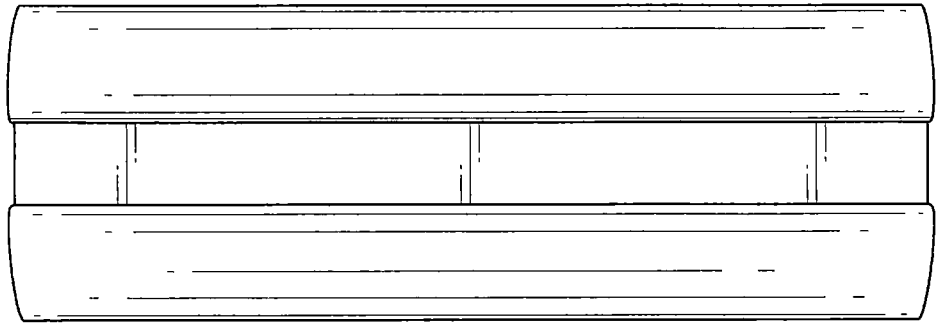

FIG. 17 is a top view of the LED light holding system of FIG. 16.

Figure 18:
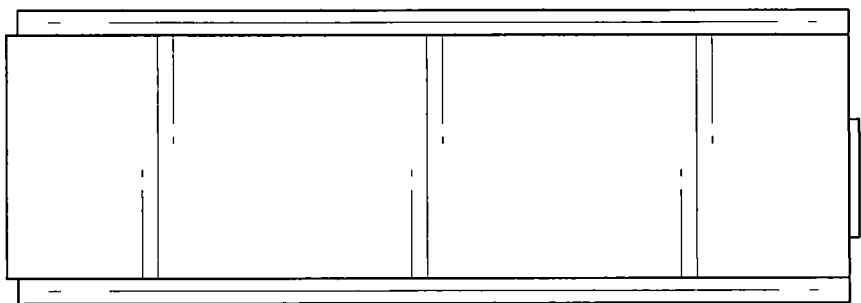

FIG. 18 is a bottom view of the LED light holding system of FIG. 16.

Figure 19:
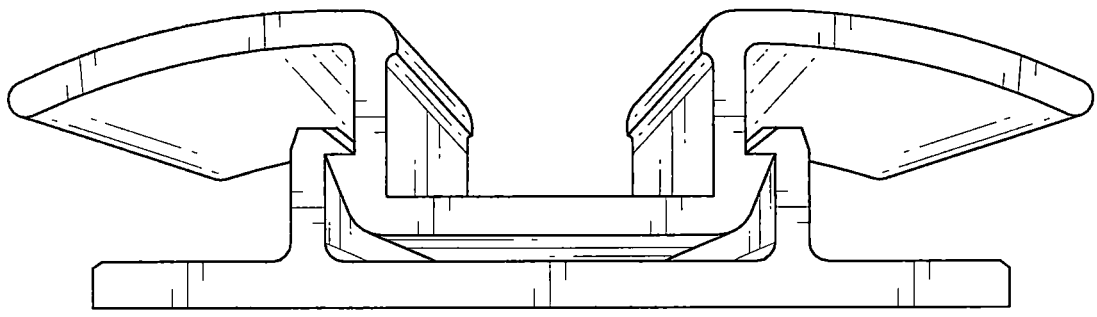

FIG. 19 is an end or lateral cross-sectional view of the LED light holding system of FIG. 16.

DETAILED DESCRIPTION OF THE INVENTION

The figures or drawings show embodiments of the light holding system of the present invention which are particularly suited for use in vehicles, such as RVs, although the present invention may be also used in a wide variety of other applications, both mobile and static. With respect to use in vehicles, the present invention may be used to hold LEDs at the junction of wall or ceiling panels on the vehicle interior, or at any desired location on top of interior wall or ceiling panels or other interior surfaces, or on exterior walls or roof surfaces. The figures are not precisely to the same scale from one figure to the next. As used herein, "longitudinal" means along or parallel to the longest dimension of the system, such as its length; "lateral" means perpendicular to the longitudinal, such as from side to side, but not as from top to bottom of the system (the bottom of the system being that portion which is closest to the surface or support to which the system is retained in the vehicle or other structure); "top of the system" means the portion of the system which is visible to the user when the system is mounted to the surface or support to which the system is retained; and "light" means a source of illumination, such as a LED.

Figure 10:
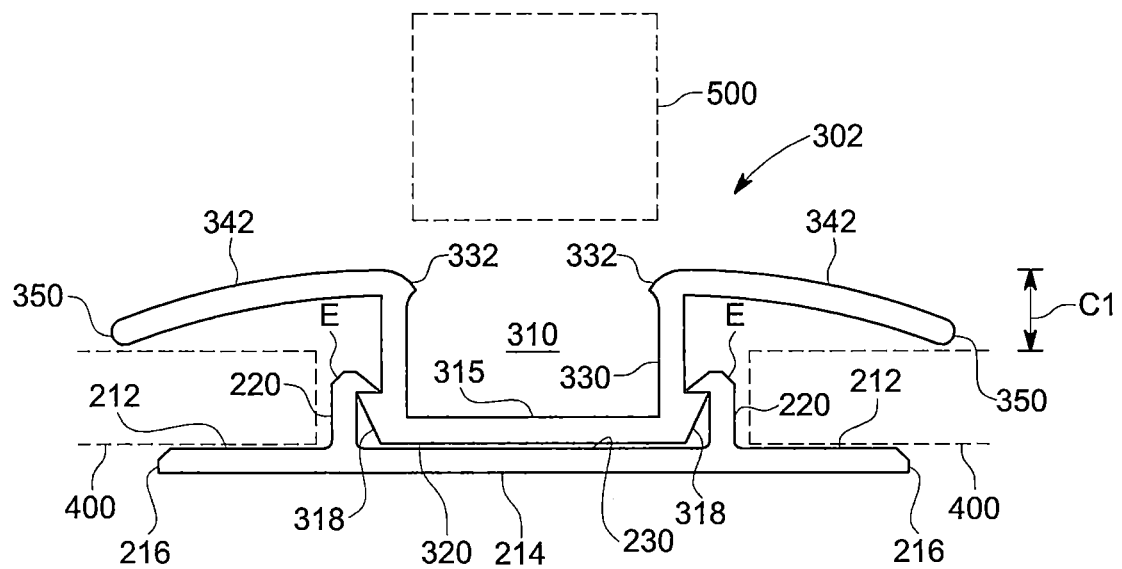
FIG. 10 is an end or lateral cross-sectional view of the LED light holding system of FIG. 9.

The following numbered features are illustrated in the figures:

an RV 100, illustrated schematically and without regard to any particular RV configuration, a mounting or underlying surface 110 contained within or on RV 100, such as a surface on a frame joist or of a wall panel, a retention strip 200, including:

a base 210, having an upper surface 212, a lower surface 214, and lateral sides 216 (the distance between sides 216 defining the lateral width of base 210), a pair of walls 220, extending upwardly a height or distance H1 from upper surface 212 of base 210, these walls being spaced apart by a distance D1, defining the spacing between the walls, a recess or groove 225, defined as the interior space between walls 220 and upper surface 212, having:

a pair of opposing interior flanges 227, one protruding from each of walls 220, each interior flange 227 having a ramp or inclined surface 228 and an undersurface 229, a bottom surface 230, coincident with upper surface 212 between walls 220, means for connecting retention strip 200 to mounting surface 110, defined by retention fasteners such as staples 11.2 or base fasteners 114 (nails, screws, rivets) or a thin adhesive film, epoxy or glue placed between mounting surface 110 and lower surface 214, or other structures which can permanently or temporarily hold retention strip 200 to a mounting surface 110 and allow the light to perform its function at that location without movement away from that mounting surface during operation of the light, an elongate light holder 300 (or, alternatively, light holder 302), including:

a channel 310, formed between or defined by channel floor or bight 315 and a pair of opposing channel walls 311 (extending upwardly a height or distance H2 from bight 315), having:

an exterior surface 312 including: a pair of opposing exterior flanges 314 (one protruding from each of walls 311, each exterior flange 314 having a ramp or inclined surface 318 and an undersurface 316), and a bottom surface 320, an interior surface 330 including a pair of opposing channel flanges 332 (or, alternatively, channel flanges 334), those channel flanges being shaped and dimensioned so as to restrict movement of an LED light strip out of channel 310, once the LED light strip is inserted into channel 310.

flanges or wings 340 (or, alternatively, wings 342), each extending from a side of channel 310 for a distance which is sufficient to at least cover one of walls 220 and render that wall not visible from the top of the system, and in preferred embodiments, wings 340 are curved and have a lateral dimension sufficient that elongate light holder 300 fully covers and conceals upper surface 212 (including any retention fasteners) from view from the top of the system when channel 310 is fully inserted and retained in groove 225, wing tip portions 350, formed on each wing 340 at the furthest extension of the wing from channel 310, means 360 for retaining elongate light holder 300 within groove 225, such as shaping, dimensioning, and spacing interior flanges 227 and exterior flanges 314 to closely engage with each other, such as by an interference fit where undersurface 229 abuts undersurface 316, or by a ferrule connection or other tight fit between walls 220 and channel 310, or by an adhesive or fastener connection between adjacent surfaces of elongate light holder 300 to retention strip 200, panels 400, which comprise structural elements of a wall and/or ceiling of RV 100, and are disposed to abut or lie adjacent to walls 220 on upper surface 212 (as shown in FIG. 10, and as compared with the mounting surface 110 in FIG. 11, which can be the same form of structural element, but used for a different purpose/mounting arrangement with respect to the present invention), LED light strip 500, and longitudinal axis A, lateral axis B, system height C, alternate system height C1, and alternate bevel E.

In operation, channel 310 is interfit and interlocked within groove 225 via a nesting connection or close stacking of those components as the elongate light holder 300 (or, alternatively, elongate light holder 302) is pushed down into retention strip 200 or slid into retention strip 200 via a longitudinal end. In preferred embodiments, either or both the elongate light holder and the retention strip are formed from somewhat flexible, plastic material which allows sufficient flexing of one or more of walls 220, channel walls 311, base 210 and/or bight 315 to "snap-fit" the elongate light holder into the retention strip. This flexibility also preferably permits the elongate light holder to be intentionally pulled apart from the retention strip. Additionally and/or alternatively, the dimensions of those components are selected to allow the elongate light holder to be intentionally slid longitudinally apart from the retention strip.

The component nesting structure of the present invention provides significant advantages of the prior art, such as that shown in the '127 patent, in that it allows the light holding system to be flatter in its projection above the surface to which it is mounted. With respect to the figures, this flatter projection means a lower height C or C1 from mounting surface 110 to the highest projection of elongated light holder 300 above mounting surface 110. This is accomplished, for example, by omission of a retaining flange projecting downward from the bottom surface 320, and instead using the interaction of walls of groove 225 with the walls of channel 310 to not merely define the location of elongated light holder 300, but also serve as the means for retaining the elongated light holder in its desired position with respect to mounting surface 110. In the prior art, for example, such retaining flanges would permit the LED strip light holder channel to rest upon the retaining groove, but not within it. Stated differently, the '127 patent interfit a projection from the LED strip light holder channel into a groove in the retention strip, but did not interfit the LED strip light holder channel itself into a groove in the retention strip. In contrast, the channel/groove nesting of the present invention presents a more compact overall system. This, for example, extends or projects a lower distance (less height C or C1) into the user space of the vehicle interior, and intrudes less into the user's visual impression of that interior space.

In addition, by interfitting a wider channel (as compared to a mere projecting flange) into a wider groove, the retention connection itself can be made more stable and easier to assemble than in prior art systems. For example, inadvertent twisting or misalignment of the prior art projecting flange during assembly can jeopardize proper interconnection with the retention groove and/or long term stability of the system and/or slow down the assembly process. Further, using pairs of spaced apart, opposing interlock elements, such as shown by and on interior flanges 227 and exterior flanges 314, can provide a more reliable and versatile interlock than with the use of a single projecting flange fit into a single retention groove.

Still further, the present invention provides systemic versatility in the selection of fastener location to attach retention strip 200 to a mounting surface. The '127 patent, for example, does not permit base fasteners to be located at the midline of the retention strip, because the retention groove provides exclusive occupation of that space. Accordingly, either "balanced" side fastener location may need to be used and/or a greater number of base fasteners used at the sides of the retention strip. In certain applications, this can slow down and/or increase the cost of mounting a light holding system in a vehicle, for example.

The '127 patent, for example, does not permit base fasteners to be located at the midline of the retention strip, because the retention groove provides exclusive occupation of that space. Accordingly, either "balanced" side fastener location may need to be used and/or a greater number of base fasteners used at the sides of the retention strip. In certain applications, this can slow down and/or increase the cost of mounting a light holding system in a vehicle, for example. In contrast, the present invention permits, in certain embodiments, use of centerline base fasteners which can streamline the mounting process, saving time and money for users.

At the same time, the present invention readily permits some spacing between the interfit channel 310 and groove 225 when that is desired to accommodate flanges of the midline base fasteners or other elements (such as pass-through supplemental wiring) between bottom surface 230 and bottom surface 320. Such accommodation is achieved, for example, by lengthening the heights H1 of walls 220 and/or H2 of channel walls 311. Alternatively, such accommodation can be changing the location and/or dimensions of the interlocking flanges 227 and/or 314 on walls 220 and channel walls 311. In preferred embodiments, however, the spacing between interfit channel 310 and groove 225 is minimal, so as to provide lower height C or C1. In those embodiments, bottom surface 230 and bottom surface 320 are adjacent or abutting, and walls 220 and channel walls 311 are, for example, shortened accordingly. However, in preferred embodiments, even with bottom surface abutment, the interfit does not prevent longitudinal sliding motion between channel 310 and groove 225 along axis A.

The present invention further provides systemic versatility by anticipating and streamlining the use of slightly different elongated light holders 300 and 302, alternatively, with the same retention strip. For example, elongated light holder 300 can be used where the LED light holding system is mounted on the surface of an interior or exterior vehicle wall or ceiling panel, while elongated light holder 302 can be used where the LED light holding system is mounted to a frame or joist between multiple wall or ceiling panels.

In preferred embodiments, pairs of interior flanges 227 and exterior flanges 314 each include inclined surfaces 228 and 318, respectively. These inclined surfaces preferably engage with each other when channel 310 is inserted into groove 225, and facilitate the downward sliding motion of channel 310 toward bottom surface 230 for interfitting. However, the present invention contemplates alternative embodiments where only one interior flange is used on each pair of walls 220 and/or channel walls 311 or where the interior and exterior flanges have rounded rather than flat inclined surfaces or where the interior and exterior flanges include some other structure or configuration to interlock, removably or permanently. In preferred embodiments, retention strip 200 and elongate light holder 300 are molded or extruded with a uniform plastic consistency, but the present invention also contemplates where the flexibility sufficient for the "snap-fit" interfitting and interlocking can be accomplished by only use of flexibility in one or more of walls 220 and/or channel walls 311 and/or specific flange portions thereof.

Figure 1:
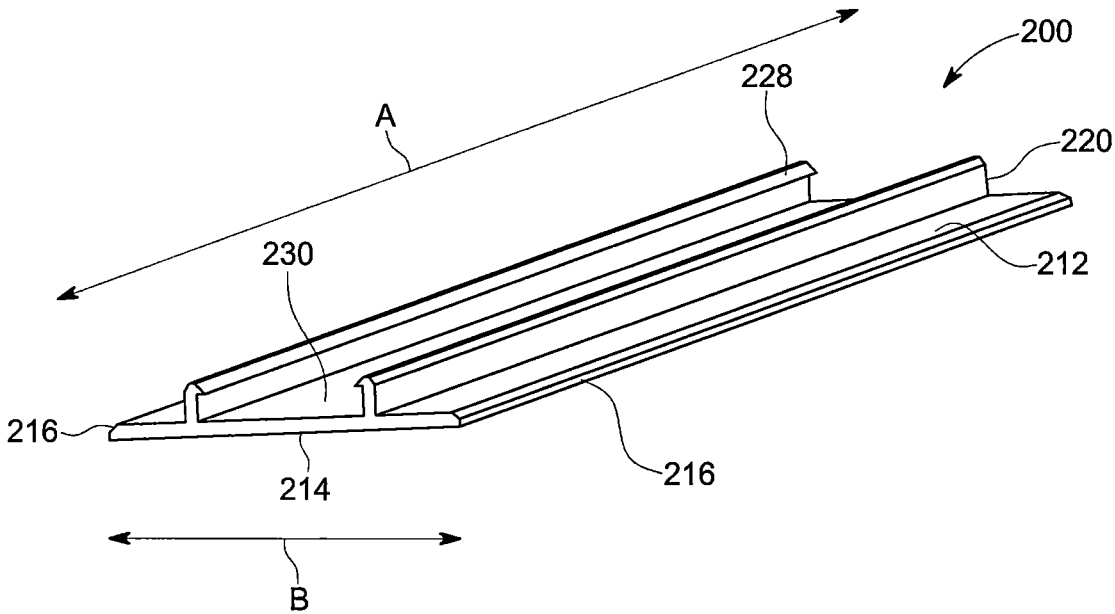
FIG. 1 is an upper, right side perspective view of a retention strip according to the present invention.
Figure 2:
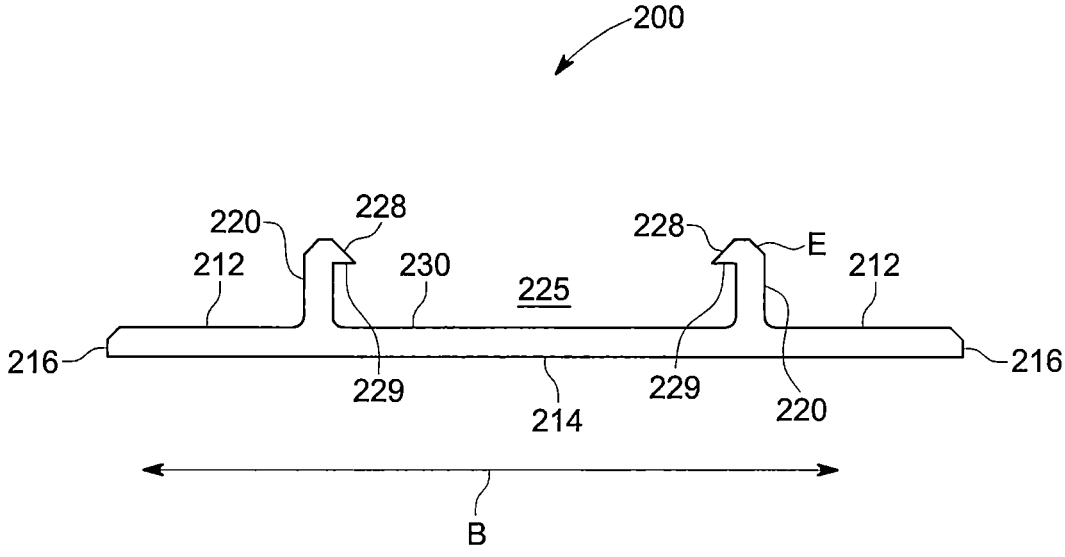
FIG. 2 is an end or lateral cross-sectional view of the retention strip of FIG. 1.
Figure 3:
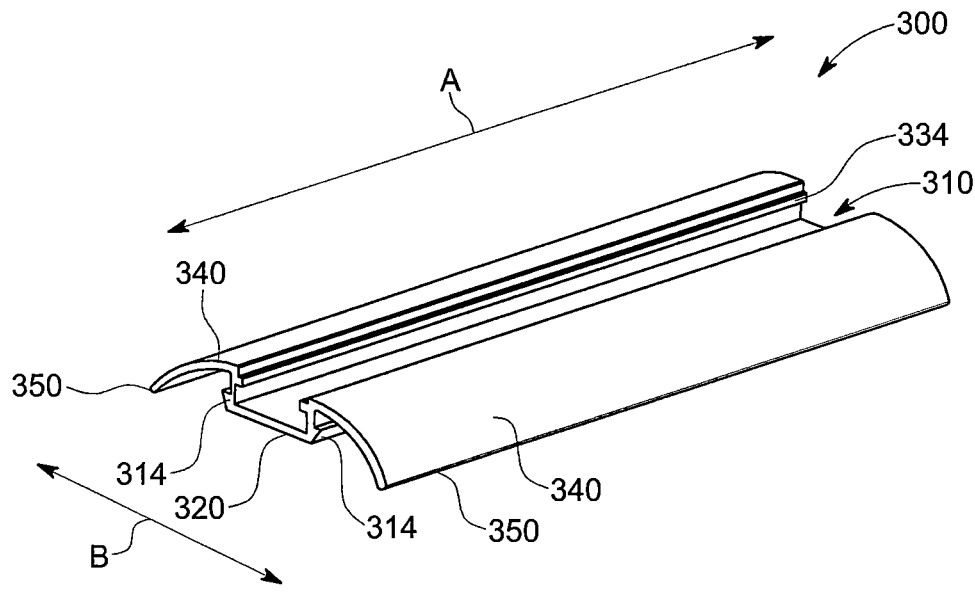
FIG. 3 is an upper, right side perspective view of a light holder strip according to the present invention.
Figure 4:
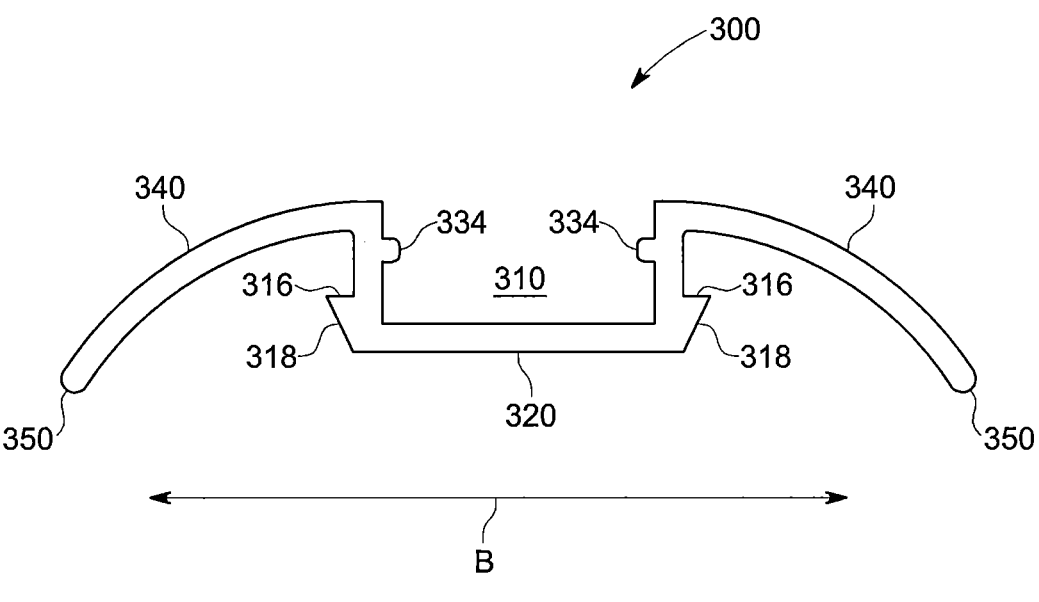
FIG. 4 is an end or lateral cross-sectional view of the light holder strip of FIG. 3.
Figure 5:
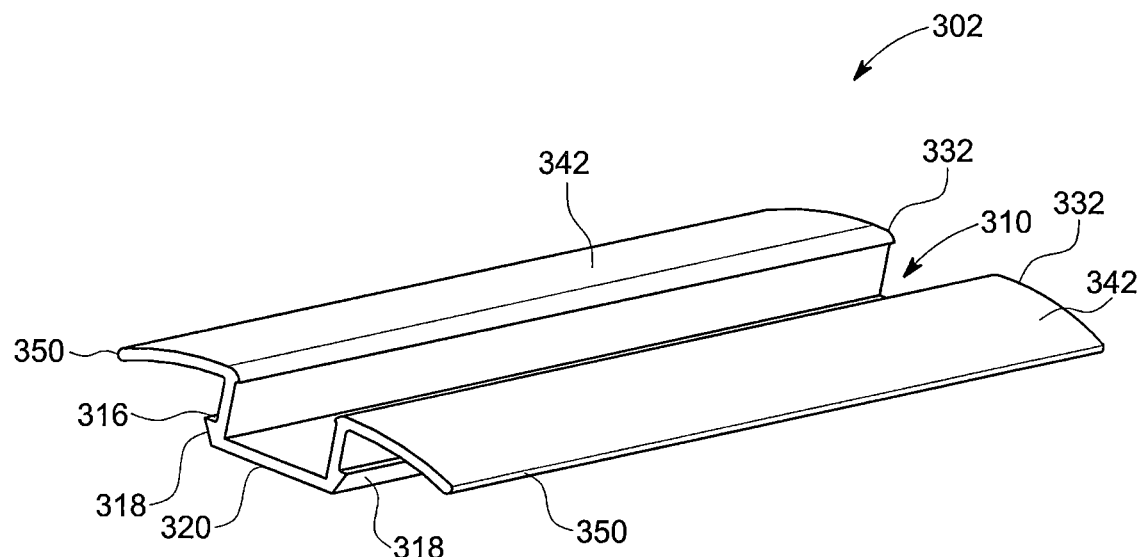
FIG. 5 is an upper, right side perspective view of an alternative light holder strip according to the present invention.
Figure 6:
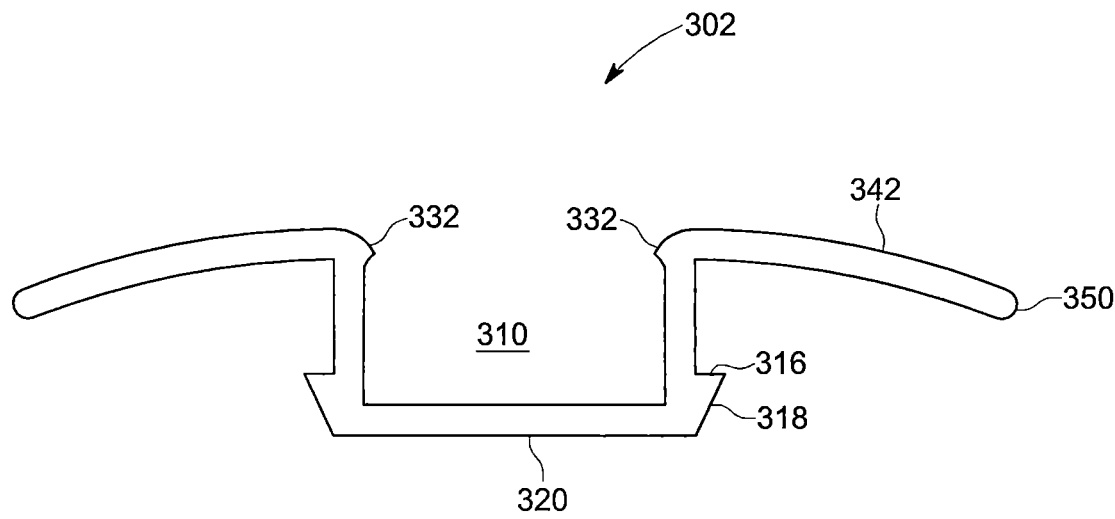
FIG. 6 is an end or lateral cross-sectional view of the light holder strip of FIG. 5.
Figure 7:
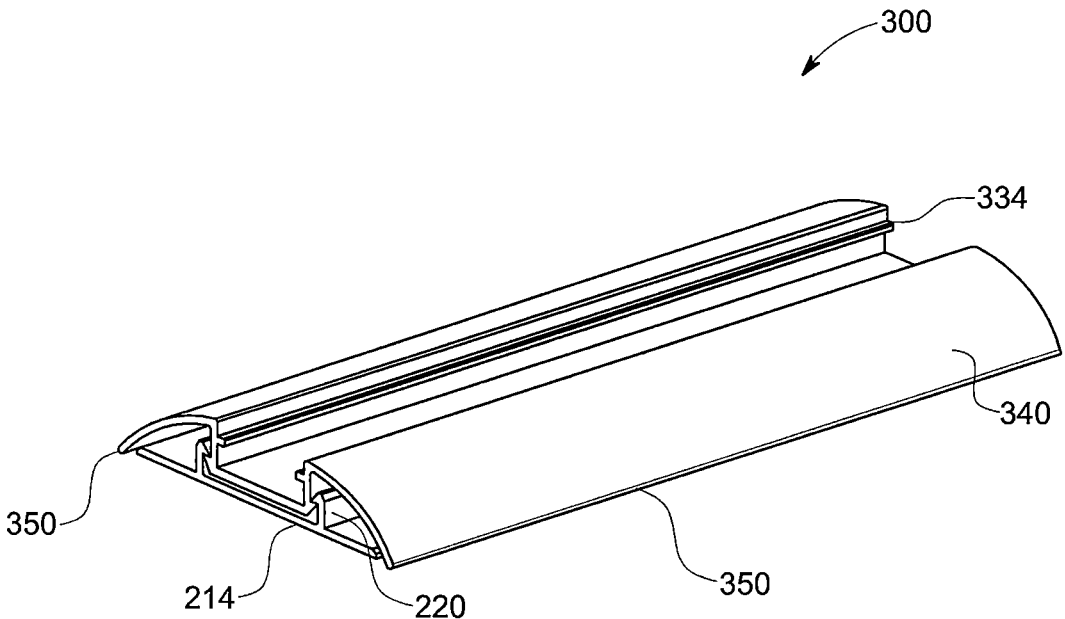
FIG. 7 is an upper, right side perspective view of an LED light holding system according to the present invention, using the elements of FIGS. 1 and 3.
Figure 8:
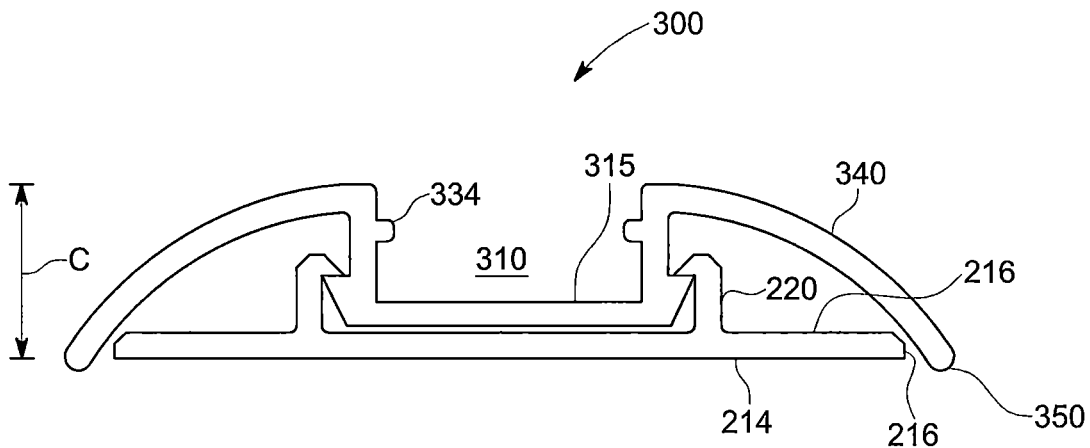
FIG. 8 is an end or lateral cross-sectional view of the LED light holding system of FIG. 7.
Figure 9:
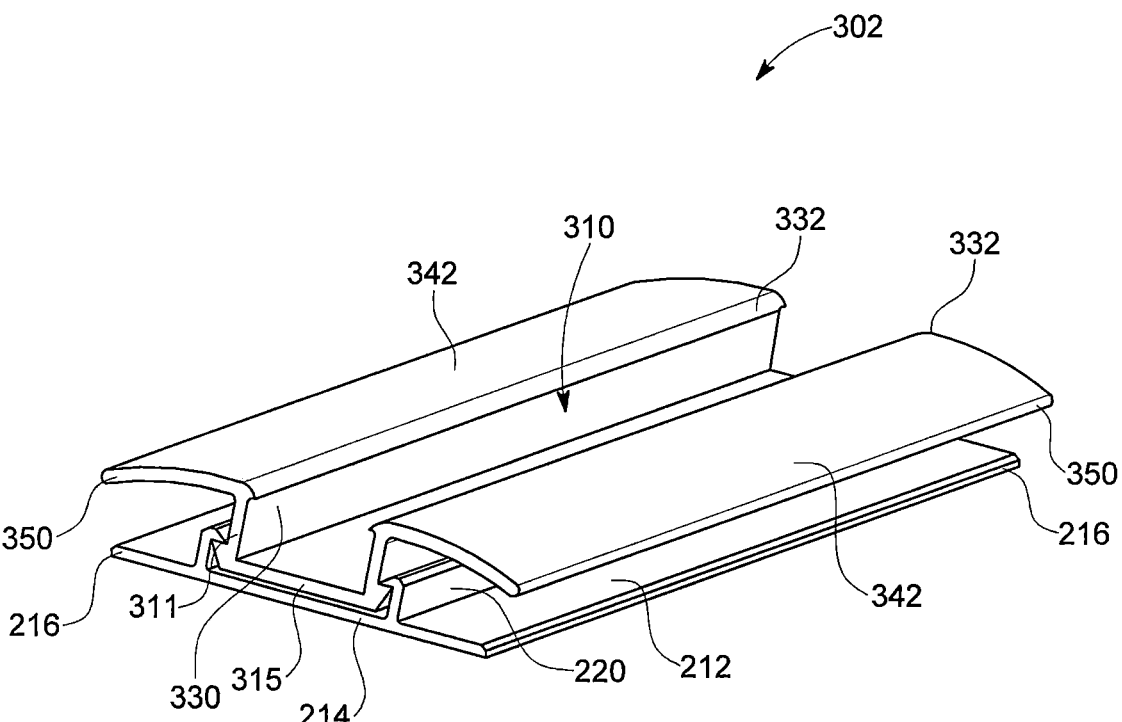
FIG. 9 is an upper, right side perspective view of an LED light holding system according to the present invention, using the elements of FIGS. 1 and 5.

Similarly, three alternative types of channel flanges are illustrated in the drawings, in FIG. 11 using flat inclined surfaces in channel flange 332 at the top of channel walls 311 (where the channel walls join wings 340), in FIG. 10 using rounded inclined surfaces in channel flange 332 at the top of channel walls 311, and in FIG. 4 using round corners in channel flange 334—spaced below the top of channel walls 311. The specific configuration of the channel flange used in the present invention is selected according to the configuration and material composition of LED strip light 500, suffice that the channel flange be formed to securely retain the LED strip light within channel 310. In preferred embodiments of the present invention, that retention capability will allow the LED strip light to be intentionally removable for servicing and/or replacement.

The system of the present invention permits two different wing configurations, 340 and 342, to be used alternatively with a common retention strip 200. Where the system of the present invention is mounted between two wall panels 400, for example, wings 342 preferably cover not just walls 220, but also the exposed sides of the wall panels which are adjacent to walls 220, when channel 310 is interfit within groove 224 (as shown in FIG. 10). In that case, wing tip portions 350 are spaced apart from sides 216 and oriented above those sides by at least the thickness of panel 400. In contrast, where the system of the present invention is mounted onto a wall panel (such as on the exterior of a vehicle, or an interior cabinet wall), wings 340 preferably cover not just walls 220, but also all of base 210, including overlaying sides 216, when channel 310 is interfit within groove 225 (as shown in FIG. 11). In that case, wing tip portions 350 may be only minimally spaced from sides 216 and oriented to be at or close to the elevational level of lower surface 214. In each case, the means for connecting retention strip 200 to mounting surface 110 would preferably be completely covered from access or top view by the elongate light holder. Thus, the system of the present invention does not require the use of different interfit and/or LED light strip holding systems depending upon where the LED light strip is placed within a vehicle. This can permit significant savings in personnel training and/or assembly, repair, and maintenance of the vehicle.

Although the present invention has been shown and described herein with respect to certain preferred embodiments and alternative configurations, those were by way of illustration and example only. For example, in especially preferred embodiments, wings 340 and 342 are somewhat flexible and are flexed upward (away from mounting surface 110 and panel 400) when channel 310 is fully interfit within groove 225 and wing tip portions 350 rest on mounting surface 110 and panel 400. In this way, wings 340 and 342 can exert a downward biasing force on mounting surface 110 and panel 400 and form a better seal thereto. Further, in especially preferred embodiments, the elongate light holder is formed from translucent material, such that illumination from LED light strip 500 is diffused laterally. This diffusion can create a less harsh visual environment for users of the present invention. Also, the elongate light holder can be formed from color coordinated material so as to blend well with the decor of the vehicle. Further, the flatter height profile permitted by the present invention can facilitate use with vehicle flooring panels, since it is less prone to cause tripping or stumbling within the vehicle, especially where wings 342 are formed to extend laterally without significant downward curvature.

Accordingly, the spirit and scope of the present invention is intended to be limited only by the terms of the appended claims.

What is claimed is:

1. A system for mounting LED light strips comprising:
a retention strip including a top surface, a bottom surface and pair of spaced apart walls projecting from the top surface which defines a retention strip channel for slidably retaining an LED light strip and each wall of the retention strip has an interior flange projecting into the retention strip channel which includes a ramp or inclined surface and an under surface;
a flexible elongated light holder, including a pair of spaced apart walls projecting from a base, which define an elongated light holder channel for retaining the elongated LED light strip in the light holder channel, with the light holder channel having an interior surface from which opposed interior channel flanges project into the light holder channel which restrict movement of the retention strip out of the light holder channel once the light holder is inserted into the light holder channel; and wherein
the flexible elongated light holder includes outwardly projecting flanges including flat surfaces which slidably engage flat surfaces of interior flanges of the retention strip to retain the flexible elongated light holder within the retention strip channel while permitting longitudinal sliding movement of the elongated light holder relative to the retention strip; and
the retention strip and the elongated flexible light holder are formed from a plastic material which flexes positioning of the elongated light holder in the retention strip to permit the flexible elongated light holder to move longitudinally relative to the retention strip channel while the bottom surface of the flexible elongated light holder is spaced from the top surface of the retention strip.

2. The system in accordance claim 1 wherein when the retention strip is mounted so that the top surface of the retention strip does not contact the bottom surface of the elongated light holder channel which permits the longitudinal movement of the flexible elongated light holder between the top surface of the retention strip and the bottom surface of the retention strip.

3. The system in accordance with claim 2 comprising:
panels comprising structural elements which are at least one of a wall or a ceiling of RV, which are disposed to abut or be adjacent to the spaced apart walls of the retention strip.

4. The system according to claim 3 wherein:
the elongated light holder channel includes an interior space, and the interior space has two opposing interior flanges; and
the elongated light holder channel is between a pair of opposing channel walls and has a bight, and includes an exterior surface, including the outwardly projected flanges on the spaced apart channel walls.

5. The system according to claim 2 wherein:
the elongated light holder channel includes an interior space, and the interior space has two opposing interior flanges; and
the elongated light holder channel is between a pair of opposing channel walls and has a bight, and includes an exterior surface, including the outwardly projected flanges on the spaced apart channel walls.

6. The system in accordance with claim 1 comprising:
panels comprising structural elements which are at least one of a wall or a ceiling of RV, which are disposed to abut or be adjacent to the spaced apart walls of the retention strip.

7. The system according to claim 6 wherein:
the elongated light holder channel includes an interior space, and the interior space has two opposing interior flanges; and
the elongated light holder channel is between a pair of opposing channel walls and has a bight, and includes an exterior surface, including the outwardly projected flanges on the spaced apart channel walls.

8. The system according to claim 1 wherein:

the retention strip channel includes an interior space and has two opposing interior flanges;

the retention strip channel comprises a space between a pair of opposing channel walls, a bight, and a surface, which includes one of an interior flanges on each of the walls of the retention strip channel.

9. The system according to claim 1 wherein:

the elongated light holder channel includes an interior space, and the interior space has two opposing interior flanges; and the elongated light holder channel is between a pair of opposing channel walls and has a bight, and includes an exterior surface, including the outwardly projected flanges on the spaced apart channel walls.

10. The system according to claim 1 comprising:

at least one of the interior flanges has an inclined surface which engages an exterior flange of the retention strip channel when the retention strip channel is inserted into the light holder channel, and a retention strip allows sliding past the interior flanges when the channel is inserted into the light holder channel.

11. The system according to claim 1 comprising:

interlocking elements which permit a sliding motion of the elongated light holder with respect to the retention strip channel.

12. The system according to claim 1 wherein the system further includes an LED light strip mounted within the retention strip channel;

a recreational vehicle; and the retention fasteners connecting the retention strip to the recreational vehicle.

\* \* \* \* \*